Oct. 24, 1950
P. W. GARBO
2,526,651
SEPARATING POWDERED CATALYSTS FROM
EXOTHERMICALLY REACTIVE GASES
Filed Aug. 2, 1945
2 Sheets-Sheet 1
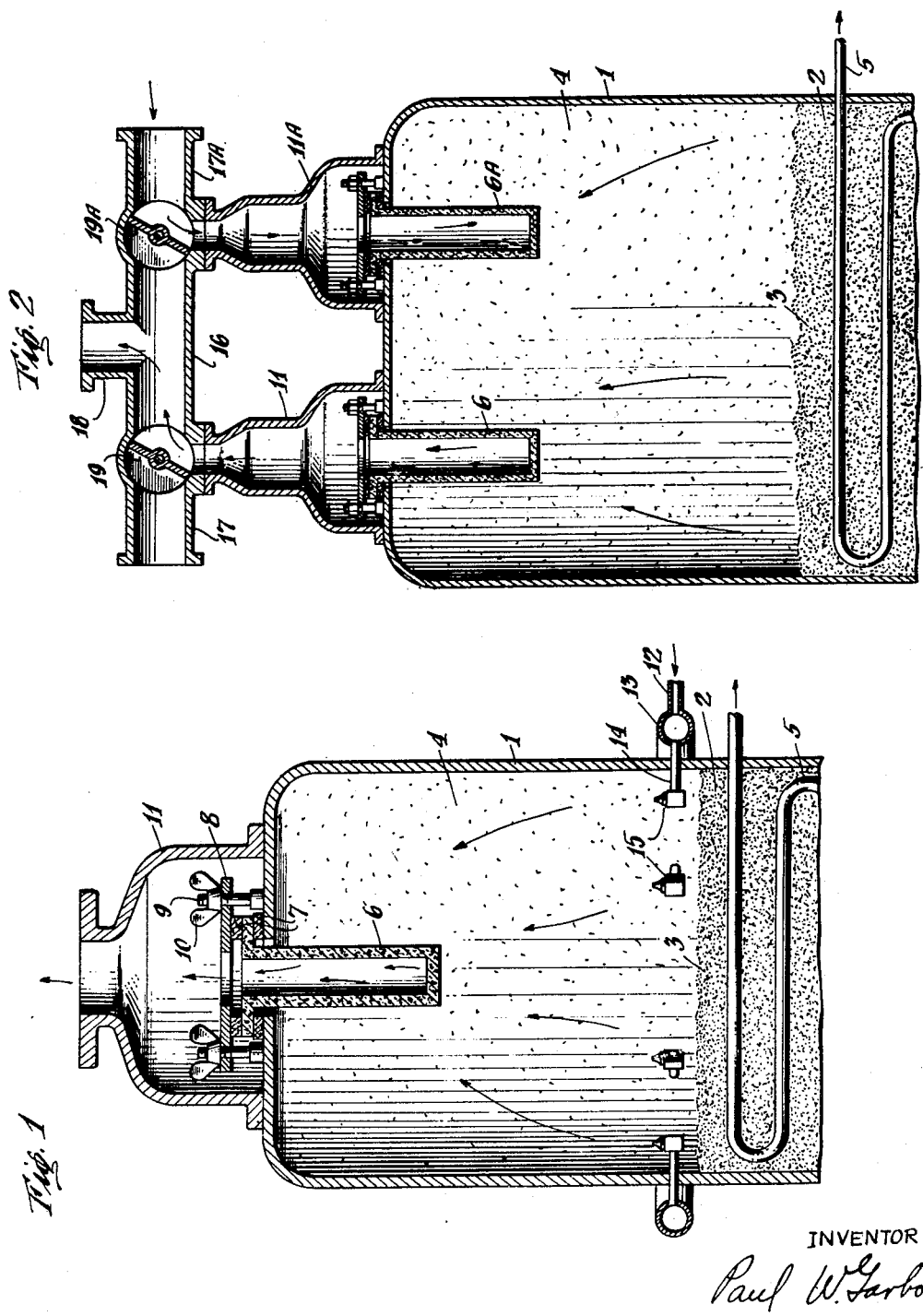
INVENTOR
Paul W. Garbo Oct. 24, 1950
P. W. GARBO
2,526,651
SEPARATING POWDERED CATALYSTS FROM
EXOTHERMICALLY REACTIVE GASES
Filed Aug. 2, 1945
2 Sheets-Sheet 2
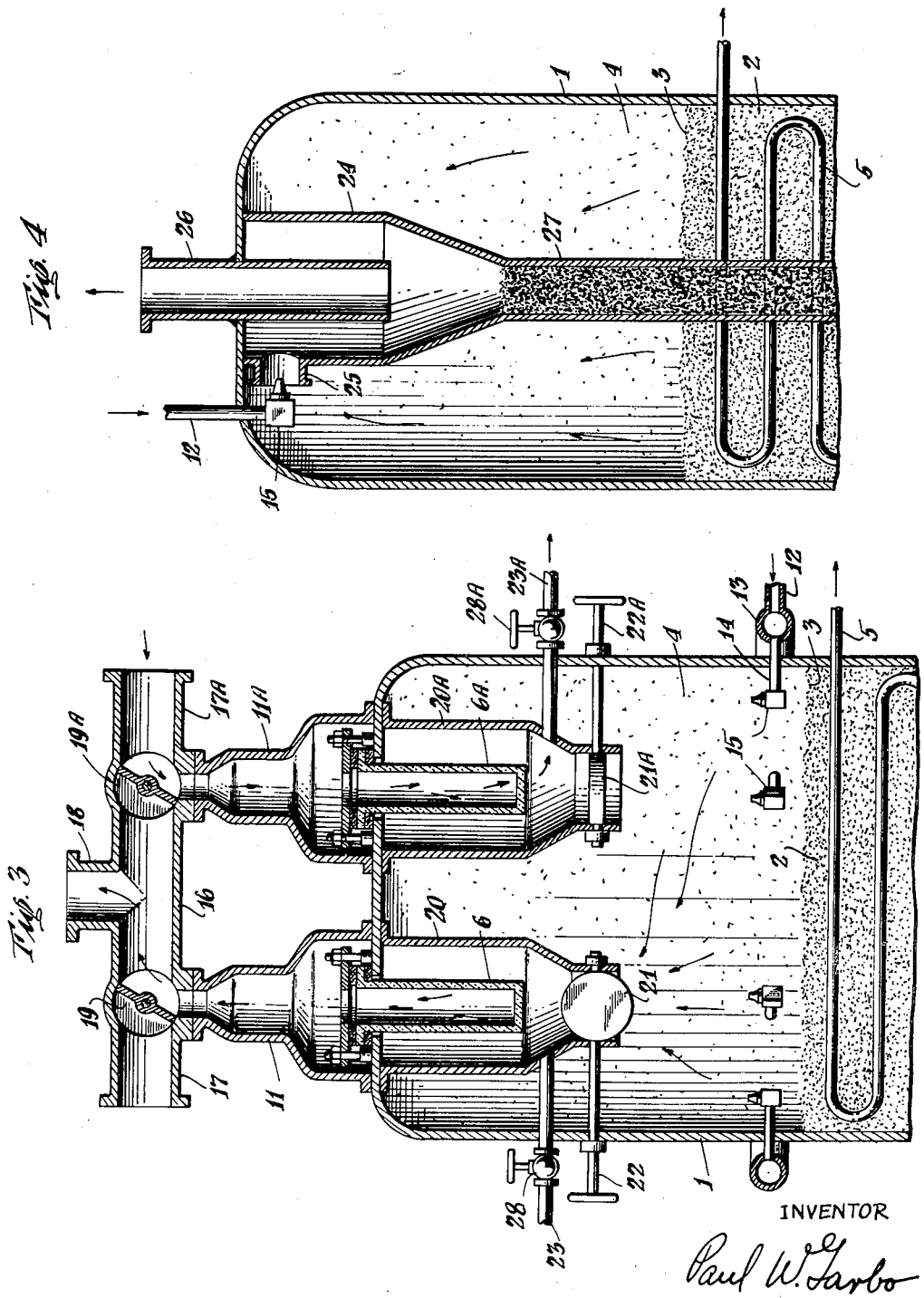
INVENTOR
Paul W. Garbo Patented Oct. 24, 1950

2,526,651

UNITED STATES PATENT OFFICE 2,526,651

SEPARATING POWDERED CATALYSTS FROM EXOTHERMICALLY REACTIVE GASES

Paul W. Garbo, Long Beach, N. Y., assignor to Hydrocarbon Research, Inc., New York, N. Y.

Application August 2, 1945, Serial No. 608,394

11 Claims. (Cl. 260—449.6)

This invention relates to a method for controlling the temperature of exothermic reactions of gases or vapors carrying entrained catalyst particles after these gaseous reactants have left the reaction zone in which temperature control means are incorporated. More particularly it relates to a method for arresting reaction when gaseous reactants flow from a dense bed of fluidized catalyst to the solids disengaging space above the pseudo-liquid level of the fluidized bed.

It is extremely important in exothermic processes to prevent the temperature from rising above the desired level in order to avoid damage to the catalyst and the formation of undesirable products. With strongly exothermic reactions such as the synthesis of hydrocarbons from carbon monoxide and hydrogen, where a fixed catalyst bed is employed it is necessary to have every catalyst particle in the immediate vicinity of, e. g., within a few centimeters, a heat exchange surface in order to avoid local overheating. The fluidized catalyst technique is especially suitable for this type of reaction because the necessity for extensive cooling surfaces or other elaborate and expensive means of obtaining close temperature control is minimized. Furthermore, unusual uniformity of temperature within the fluidized reaction mass is attained because of the turbulent motion of the catalyst particles and gaseous reactants.

Difficulty arises, however, from the lack of effective temperature control once the reactants have left the fluidized catalyst mass for which practical cooling means are known. Since the gases emerging from the fluidized dense bed always entrain a certain amount of the powdered catalyst and both gases and catalyst are at reaction temperature, the reaction continues to take place between unreacted or incompletely reacted components in contact with the suspended catalyst particles. Because of the exothermic nature of the reaction, the temperature rises and may reach the point where the character of the products deteriorates markedly and the catalyst is damaged. Such a condition most frequently develops when the emerging gases contain a relatively large proportion of unreacted components, as when the reaction is carried out in a stepwise manner, and when for some reason local increases occur in the concentration of entrained catalyst, as, for example, within a cyclone separator or where the catalyst collects upon a surface in contact with the gases. Thus, when a porous refractory element is used to filter off powdered iron catalyst from reaction gases containing some unreacted hydrogen and carbon monoxide, the layer of catalyst which builds up on the filter element may easily attain a temperature above 900° F., thereby injuring the catalyst and synthesis products. The catalyst layer may even coke up so that blowing-back is not effective in knocking the catalyst off from the filter element. Cooling the gases and entrained catalyst sufficiently to stop or materially diminish the exothermic reaction is not feasible in commercial-scale operations. To accomplish such cooling, the size and complexity of the reactors would be inordinately increased. For such reasons ordinary heat exchange surfaces disposed within the disengaging space above a fluidized bed have not been found practical for arresting the reaction of unreacted gases carrying powdered catalyst in suspension.

An object of my invention is to provide effective and convenient means for controlling exothermic reactions as unreacted gases and suspended catalyst powders pass from reaction zones provided with suitable control means to zones not so provided.

A further object is to prevent the temperature of incompletely reacted gases carrying entrained catalyst from rising above a desired level because of a continuing exothermic reaction after they have left the main reaction zone.

Another object is to prevent degradation of the reaction products and/or catalyst from overheating by the heat generated by continuance of an exothermic reaction outside of the sphere of influence of the control means applied to the reactor.

A still further object is to facilitate the carrying on of gaseous exothermic reactions involving fluidized catalysts in a step-wise manner.

Still another object is to simplify the removal of entrained catalyst powder from incompletely reacted gases emerging from a controlled reaction zone, without resorting to expensive and cumbersome cooling devices to avoid undesired effects from a continuing exothermic reaction.

These and additional objects of my invention will become apparent from the description which follows.

In accordance with my invention, the control of an exothermic reaction of a gaseous suspension comprising incompletely reacted gases or vapors and powdered catalyst is achieved by introducing into the suspension an agent which diminishes or even nullifies the activity of the catalyst. Through proper selection of agent and regulation of amount used, the exothermic reaction may be restrained or completely blocked, as desired. While the process of my invention is applicable to any exothermic system wherein unreacted gases carrying catalyst particles pass from a reaction zone having suitable control means to a zone lacking adequate controls, it is particularly valuable in fluidized catalyst operations.

The agent injected into the gaseous suspension may be in solid, liquid or gaseous form so long as under the conditions of use it exerts a repressive effect on the activity of the catalyst. However, for simplicity and rapidity of mixing the agent with the gaseous suspension, it is generally desirable to add a gaseous agent or one that has been pre-vaporized. The catalyst repression agent may be any material known to act as a poison toward the particular catalyst in use and, preferably, is of the type which is readily dispelled when it is desired to have the catalyst in a regenerated condition again.

The accompanying drawings, in which similar parts are designated by like reference characters, diagrammatically illustrate in vertical section the upper portion of four forms of fluidizing reactor suitable for carrying out the process of my invention. It should be understood that these illustrations are only by way of example and that many other modifications and alternative arrangements fall within the scope of the invention.

Figure 1 shows the upper part of a reactor for carrying out fluidized catalyst processes in which means are provided for introducing a gaseous or liquid agent at a plurality of points and in which entrained catalyst is removed from the effluent gases by means of a replaceable filter element.

Figure 2 shows the upper part of a reactor having two filter elements which, alternately, are employed to separate the catalyst from the gaseous effluents and to inject the catalyst repressor.

Figure 3 shows a modification of the apparatus of Figure 2 to permit the removal of the separated catalyst from the reactor.

Figure 4 shows the upper part of a reactor in which a cyclone separates entrained catalyst from the effluent gases, while a suitable agent is injected into the gaseous suspension to control any continuing exothermic reaction.

Referring to Figure 1, the reference character 1 denotes a vertical reaction chamber adapted to carrying out reactions in the presence of a fluidized catalyst. The shape of the reactor is not critical and various forms may be employed. The lower part, which may be provided with the usual gas feed pipes, catalyst draw-off pipes, etc., has been omitted for the sake of simplicity. Within reactor 1 a mass 2 of finely divided catalyst is maintained in a turbulent state by the upward flow of gaseous reactants which have a velocity not quite sufficient to overcome all the gravitational forces on the catalyst particles, with the result that a relatively dense but fluidized bed of catalyst resides in the lower portion of reactor 1. This dense catalyst mass appears to act as a boiling liquid and has a pseudo-liquid level 3 which is the region where the reaction gases separate themselves from the bulk of the catalyst mass. Because of the tendency for some of the catalyst particles to become entrained in the emerging gases, a cloud or relatively light dispersion of catalyst is formed above level 3; settling zone 4 is provided to assist in disengaging the gases from the catalyst particles. Disposed within catalyst mass 2 is a cooling coil 5 through which water or other suitable cooling medium is passed. The means of controlling the temperature within the dense bed of fluidized catalyst forms no part of the invention, however, and any other suitable means may be employed, such as circulating the fluidized catalyst through an external cooler.

A filter element 6, e. g., porous alumina refractory, is positioned within the outlet of reactor 1 and may be conveniently fastened by means of clamping ring 8. Suitable gaskets 7 are placed on both sides of the flanged edge of filter 6 and clamping ring 8 is tightened by turning down nuts 10 on bolts 9. Gases passing through filter 6 enter outlet dome 11, which may be secured to the reactor 1 by welding.

In the vicinity of the pseudo-liquid level 3 of the fluidized catalyst mass 2 means are provided for introducing an agent which represses or stops the catalytic reaction. The agent may be introduced through line 12 into a circular manifold 13 from which it discharges by way of branch lines 14 and nozzles 15 into the catalyst disengaging or settling zone 4. In this manner, any continuing exothermic reaction within zone 4 and especially on the surface of filter 6 where the catalyst powder tends to build up an appreciable layer is diminished or checked completely, as desired.

Figure 2 shows a system which is adapted for introducing the catalyst repressor and simultaneously using it as the gas for blowing back catalyst collecting upon the filter. For this purpose, reactor 1 is provided with two outlets 11 and 11A, having filters 6 and 6A, respectively. Outlet members 11 and 11A are connected to a common manifold 16 by way of valves 19 and 19A, respectively, which can be turned so that each outlet member communicates either with discharge line 18 or with one of the inlet lines 17 and 17A through which the repressing agent is introduced. This alternating arrangement obviates special means for introducing the repressing agent, such as shown in Figure 1, and avoids interruptions in the withdrawal of reaction gases caused by periodic blow-backs to clear the filters.

In operation the two valves 19 and 19A are turned alternatingly with each other to put their respective outlet domes 11 and 11A into communication with discharge line 18 and inlet line 17 or 17A, respectively. Thus, with the valve setting shown in Figure 2, while product gases from the reactor are passing out through filter 6, outlet 11, valve 19, manifold 16 and discharge line 18, the catalyst repressing agent is flowing through inlet line 17A, valve 19A, outlet 11A and filter 6A into disengaging zone 4. When it is desired to remove the catalyst layer which has been formed on filter 6, the settings of valves 19 and 19A are reversed so that the repressing agent is charged into the reactor from line 17 through filter 6 while the effluent gases pass out of the reactor through filter 6A and discharge line 18.

In Figure 3, the filters 6 and 6A are enclosed in casings 20 and 20A, respectively, equipped with dampers or valves 21 and 21A which are controlled by valve stems 22 and 22A. The operation of these valves is synchronized with that of valves 19 and 19A to permit reaction products to enter the unit which has been placed in communication with discharge line 18 and to close the other unit during the blow-back period. With this arrangement, the catalyst removed from the surface of filter 6 or 6A passes out of the reactor through purge line 23 or 23A, respectively. Valves 28 and 28A are also provided to close purge lines 23 and 23A when the respective casings to which they are attached are in communication with settling zone 4. The medium used for removing catalyst from the filters may be either the repressing agent or any other desired fluid, gaseous or even liquid. The catalyst thus withdrawn from the reactor may be put through a regeneration step before reinjection into the reaction zone. The device for introducing the catalyst repressor in the present apparatus is the same circular manifold and nozzle arrangement as shown in Figure 1. It is understood that the catalyst purged from the filters may be returned to the reactor by the usual methods, e. g., by suspension in the feed stream of reactant gases. With the valve setting shown in Figure 3, the repressor discharges from nozzles 15 and mixes with the reaction gases in settling zone 4. The mixed gases pass through open damper 21 and filter 6 separates entrained catalyst powder. The filtered gases leave through discharge line 18. At the same time, a purging medium, e. g., hydrogen, nitrogen or steam, entering through inlet 17A dislodges any catalyst powder deposited on filter 6A and carries it out of casing 20A by way of purge line 29A. Valve 28A is open while valve 28 is closed. By changing the valve setting, filter 6 may be purged and filter 6A used to filter the reaction gases.

In Figure 4 a cyclone separator 24 is used to separate entrained cataylst from gases leaving reactor 1. Separator 24 has an inlet 25, a gas outlet 26 and a standpipe 27 for conducting the separated catalyst powder back into the fluidized catalyst bed 2. In this case the catalyst repressor may be simply injected into cyclone inlet 25 through nozzle 15, although it may be fed into settling zone 4, as shown in Figures 1 and 3, particularly in cases of highly exothermic reactions which tend to continue even when there is a relatively low concentration of suspended catalyst in zone 4. This system may be adapted to permit external regeneration of catalyst by having standpipe 27 discharge into an external hopper or regenerator, or a conventional arrangement of external cyclones, hoppers, regenerator, etc., may be employed, with introduction of the catalyst repressing agent into the settling zone or directly into the cyclone separator as the case may require.

As a specific example of the use of my invention, I maintain in reactor 1 a fluidized bed of powdered iron catalyst while passing therethrough synthesis gas comprising hydrogen and carbon monoxide under conditions of temperature and pressure suitable for the formation of hydrocarbons. Excess heat of reaction is removed from the fluidized mass 2 by a cooler 5 or by circulating the fluidized catalyst through an external cooling unit. Ammonia is introduced through line 12 in amounts equal to about 5 to 15% by volume of the unreacted carbon monoxide in the gas emerging from the bed of fluidized catalyst. Larger amounts of this catalyst repressor are not harmful. Reactivation of the catalyst which has been exposed to the ammonia is not necessary since the repression or poisoning of the catalyst is of a transient nature. Therefore, the catalyst may be permitted to fall back into the fluidized catalyst bed after its separation from the effluent gases without detriment to the reaction. The reactor arrangements shown in Figures 1, 2 and 4 are suitable for this example. The ammonia leaving reactor 1 in admixture with the reaction gases is contained predominantly in the aqueous phase which is formed when the reaction products are condensed, thus facilitating its separation. Any ammonia which remains in the products after this separation has no harmful effects, and may be removed by conventional methods. When ammonia is the repressor of a catalyst for the hydrogenation of carbon monoxide it has the added advantage of neutralizing the acidic compounds which are found in the reaction products; corrosion troubles are thereby minimized.

Several schemes have been proposed to control exothermic reactions, which depend upon the introduction of substances other than the reactants into the system to exert some physical effect, e. g., dilution of the reactants or heat abstraction through vaporization of an added substance. Such methods depending upon a mere physical effect suffer from the inherent disadvantage that a relatively large amount of the material must be added, necessitating the use of larger equipment and complicating the fractionation and recovery of the reaction products.

In contrast to such prior proposals, my invention utilizes an agent which exerts a negative catalytic or catalyst-poisoning action. While some might argue that my catalyst repressors function physically as much as chemically, in the final analysis it is to be noted that a catalyst repressor for the purposes of my invention is an agent which permits control of an exothermic reaction to a greater degree than is attributable to mere dilution and heat absorption effects. When the repressing agent has only a transient effect upon the catalyst, regeneration of the portion of the catalyst which has been exposed to this agent is not necessary and the catalyst may be permitted to return directly to the main reaction zone. When the repressor is of the type of a persistent poison, it is usually desirable to remove the contaminated portion of the catalyst for regeneration outside the reactor, in order to prevent the main body of the catalyst from becoming gradually deactivated or the accumulation of an appreciable concentration of repressor within the reaction zone. It is interesting in this connection, however, that some substances which exert a repressing action at certain concentrations are substantially without effect or are even beneficial to the catalytic reaction when present in smaller concentrations. It is apparent that where the amount of the agent introduced into the main body of the reaction by the contaminated catalyst is below a harmful level the removal and regeneration of this catalyst outside the reactor may not be necessary. Ammonia may be considered a catalyst repressor of this type. In the synthesis of hydrocarbons, when ammonia is present in amounts equal to about 5 to 15% by volume of the carbon monoxide, the catalytic hydrogenation of carbon monoxide is measurably repressed; on the other hand, it is reported that traces of ammonia enhance catalytic activity in the synthesis of hydrocarbons.

Through my invention I have been enabled to devise a new process for the catalytic hydrogenation or carbon monoxide involving stepwise operation in two or more fluidizing reactors and separation of reaction products, particularly water, from the unreacted components between steps. By this process, the fluidizing catalyst technique is applied to the hydrogenation of carbon monoxide under very favorable conditions since it is possible to withdraw reaction products one or more times in the course of the reaction and thus minimize the undesirable effects of increasing concentration of reaction products in the reacting gases. Removal of the water of reaction between steps apparently is conducive to the maintenance of higher catalytic activity. At the same time, these advantages are realized without encountering the difficulties of separating entrained catalyst powder from gases comprising exothermically reactive components. The process, for example, may be employed to synthesize hydrocarbons in the presence of comminuted catalysts prepared from metals of the iron group. Two or three fluidizing reactors, preferably of decreasing capacity, are arranged serially with provisions for the withdrawal of reaction products between reactors. At these withdrawal points, there is a preceding separation of entrained catalyst from the reaction gases, conducted in the presence of a catalyst repressor, e. g., ammonia, in accordance with my invention. Generally, in such stepwise operation, ⅓ to ⅔ of the carbon monoxide charge will be converted in the first reactor, the remainder being found in the effluent gases and converted in subsequent reaction steps.

The purpose of using a catalyst repressor is not limited to facilitating stepwise operation. The process of my invention is equally applicable, for instance, to catalytic oxidations in which it is desired to use an excess of oxidizing gas to attain more nearly complete conversion of an organic compound to an oxygenated product without producing carbon dioxide and the like because of over-oxidation. Such over-oxidation is certain to occur in a fluidizing system unless the catalytic reaction is controlled through the addition of a catalyst repressor in the region in which the separation of reaction gases and catalyst powder is effected. Similarly, my process is of use in the selective hydrogenation of certain components of mixtures of olefinic compounds, the objective being to prevent excess hydrogen from adding to the olefins that are desired unaltered.

Those skilled in the art are aware that there are many substances known to act as catalyst repressors or poisons; the selection of these substances for the purposes of my invention will of course depend upon the particular reaction and catalyst which are to be controlled, on the reactivity of the substance with the gaseous reactants or products, on the ease of regenerating the catalyst, on the facility with which the substance may be separated from the reaction gases, etc.

By way of example, the following combinations of reactants, catalysts and poisons are cited. In the vapor-phase catalytic oxidation of aromatic compounds like toluene and naphthalene to benzoic acid and phthalic anhydride, respectively, in the presence of catalysts such as vanadium and chromium oxides, suitable repressors are lead tetraethyl, iron pentacarbonyl and iodine vapor. Similarly, the oxidation of methanol to formaldehyde with a catalyst of the molybdenum oxide type may be controlled by additions of chlorine- or sulfur-containing compounds. Reactions catalyzed by platinum may be repressed by the introduction of carbon monoxide. The destructive hydrogenation of mineral oils in the presence of a catalyst comprising molybdenum sulfide and zinc oxide is brought under control by using steam or oxygen as repressor. Besides ammonia previously mentioned hereinabove, the catalytic synthesis of organic compounds from hydrogen and carbon monoxide with the aid of an iron, nickel or cobalt catalyst may be controlled by sulfur compounds, e. g., hydrogen sulfide and thiophene.

When ammonia is used according to the invention in the synthesis of hydrocarbons or other catalytic reactions, a special advantage obtains in cases where electrostatic precipitation methods are employed for separating entrained catalyst from the effluent gases, since it is known that such separations are greatly facilitated by the presence of ammonia.

The invention is not predicated on the use of special temperatures, pressures, velocities, contact times, catalyst particle sizes, etc., and, accordingly, no attempt is made to define the operable ranges for such process factors. Furthermore, these data vary with the reactions and are known to those skilled in the arts.

It is apparent that numerous modifications may be made in the specific arrangements and procedures described without departing from the scope of the invention.

I claim:

1. In fluidized catalyst dense-phase processes involving exothermic reactions, the method of separating entrained catalyst particles from incompletely reacted gases or vapors, which comprises flowing said gases or vapors into a zone comprising a plurality of filtering portions, filtering said gases or vapors by passage through at least one of said filtering portions, and simultaneously introducing into said zone by passage in the reverse direction through at least one other of said filtering portions a substance which chemically represses the activity of said entrained catalyst particles.

2. The method of claim 1 wherein the catalyst comprises an element of the iron group and the incompletely reacted gases comprise hydrogen and carbon monoxide.

3. The method of claim 2 wherein the substance is ammonia.

4. The stepwise process of synthesizing hydrocarbons from hydrogen and carbon monoxide by contact with particulate catalyst comprising an element of the iron group in a fluidized state, which comprises introducing said gaseous reactants into a fluidized bed of said catalyst, effecting reaction of only a portion of said gaseous reactants while passing through said fluidized bed, withdrawing from said fluidized bed a gaseous stream containing a portion of said gaseous reactants, the products of reaction and entrained particles of said catalyst, adding to said gaseous stream an amount of catalyst poison which chemically represses the activity of said catalyst but which is insufficient to effect substantial cooling by heat absorption, separating said entrained particles from said gaseous stream, removing at least a portion of said products of reaction and said catalyst poison from said gaseous stream, thereafter introducing said gaseous stream into a second fluidized bed of said catalyst, and effecting reaction of a further portion of said gaseous reactants while passing through said second fluidized bed.

5. The stepwise process of claim 4 wherein the catalyst poison is ammonia.

6. The stepwise process of claim 4 wherein the catalyst poison is hydrogen sulfide and the entrained catalyst particles which are separated from the gaseous stream are regenerated and then returned to the fluidized bed.

7. In an apparatus for fluidized catalyst conversions wherein a gaseous stream flows upwardly through a dense, suspended catalyst phase in the lower portion of a vertically elongate chamber and emerges from said dense phase in the upper portion of said chamber, the improvement which comprises at least two housings disposed in the upper portion of said chamber, a valved opening in each of said housings to provide communication between said elongate chamber and the interior of each of said housings, an outlet pipe communicating with the interior of each of said housings, a filter in each of said housings interposed between the valved opening and the outlet pipe of each of said housings, a withdrawal pipe communicating with each outlet pipe for withdrawing filtered gas from each housing, a feed pipe communicating with each outlet pipe for introducing a blow-back gas into each housing by passage through the filter in said housing, and a discharge pipe for the blow-back gas communicating with the portion of the interior of each housing which portion lies between the valved opening and the filter in said housing.

8. In fluidized catalyst dense-phase processes involving the synthesis of hydrocarbons from hydrogen and carbon monoxide by contact with particulate catalyst comprising an element of the iron group, the method of separating entrained catalyst particles from incompletely reacted gases, which comprises simultaneously flowing said gases into a zone comprising a plurality of filtering portions, introducing into said gases flowing into said zone an amount of catalyst poison which chemically represses the activity of said entrained catalyst but which is insufficient to effect substantial cooling by heat absorption, filtering said gases containing said catalyst poison by passage through at least one of said filtering portions to separate therefrom said entrained catalyst without an undesirable temperature increase, and removing catalyst accumulated in at least one other of said filtering portions which has previously been separating said entrained catalyst from said gases containing said catalyst poison.

9. In the exothermic synthesis of hydrocarbons, oxygenated hydrocarbons and mixtures thereof from hydrogen and carbon monoxide in the presence of a fluidized dense bed of catalyst particles comprising an element of the iron group wherein a gasiform stream emerges from said bed and contains unreacted hydrogen and carbon monoxide and entrained catalyst particles, the improvement which comprises injecting into said gasiform stream as it emerges from said bed an amount of catalyst poison which chemically represses the activity of said catalyst particles but which is insufficient to effect substantial cooling by heat absorption, and separating said entrained catalyst particles from said gasiform stream containing the injected catalyst poison without an undesirable temperature increase.

10. The synthesis process of claim 9 wherein the catalyst poison is ammonia.

11. The synthesis process of claim 10 wherein the catalyst is essentially an iron catalyst.

PAUL W. GARBO.

REFERENCES CITED

The following references are of record in the file of this patent:

UNITED STATES PATENTS

| Number | Name | Date |
| --- | --- | --- |
| 1,784,339 | Clasen et al. | Dec. 9, 1930 |
| 1,806,513 | Straus-Scharinal | May 19, 1931 |
| 1,845,058 | Pier | Feb. 16, 1932 |
| 2,291,510 | Thomas et al. | July 28, 1942 |
| 2,347,682 | Gunness | May 2, 1944 |
| 2,356,717 | Williams | Aug. 22, 1944 |
| 2,391,534 | Yerrick et al. | Dec. 25, 1945 |
| 2,393,778 | Hull | Jan. 29, 1946 |
| 2,394,651 | Alther | Feb. 12, 1946 |
| 2,409,751 | Gerhold et al. | Oct. 22, 1946 |
| 2,417,164 | Huber | Mar. 11, 1947 |
| 2,429,751 | Gohr et al. | Oct. 28, 1947 |
| 2,448,279 | Rubin | Aug. 31, 1948 |

FOREIGN PATENTS

| Number | Country | Date |
| --- | --- | --- |
| 444,936 | Great Britain | Mar. 31, 1936 |